US007818738B2

(12) United States Patent
Barmettler et al.

(10) Patent No.: US 7,818,738 B2
(45) Date of Patent: Oct. 19, 2010

(54) SYSTEM AND METHOD FOR AUTOMATICALLY IDENTIFYING A UNIT OF CHANGE REQUIRING UPGRADE IN A DATABASE MANAGEMENT SYSTEM

(75) Inventors: John Charles Barmettler, San Jose, CA (US); Angelique Nicole Greenhaw, Los Gatos, CA (US); Terry Lee Krein, Campbell, CA (US); Karen Alicia Ranson, San Jose, CA (US); Francis Joseph Ricchio, San Jose, CA (US); Thanh Tien, Milpitas, CA (US); Judy Y. Tse, San Jose, CA (US); Anuradha Venkata Vakkalagadda, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 977 days.

(21) Appl. No.: 11/611,723

(22) Filed: Dec. 15, 2006

(65) Prior Publication Data
US 2008/0147744 A1    Jun. 19, 2008

(51) Int. Cl.
*G06F 9/44* (2006.01)
*G06F 7/00* (2006.01)
(52) U.S. Cl. .................... 717/168; 707/610; 707/624
(58) Field of Classification Search ............. 717/168; 707/610, 624
See application file for complete search history.

(56) References Cited

U.S. PATENT DOCUMENTS

| 5,586,304 | A |   | 12/1996 | Stupek, Jr. et al. ......... 395/712 |
| 6,094,654 | A | * | 7/2000  | Van Huben et al. ............. 1/1 |
| 6,185,577 | B1 |   | 2/2001  | Nainani et al. ............. 707/202 |
| 6,185,699 | B1 |   | 2/2001  | Haderle et al. ............. 714/19 |
| 6,230,164 | B1 | * | 5/2001  | Rekieta et al. ............. 707/624 |
| 6,295,610 | B1 |   | 9/2001  | Ganesh et al. ............. 714/19 |
| 6,763,403 | B2 | * | 7/2004  | Cheng et al. ............. 710/36 |
| 7,543,024 | B2 | * | 6/2009  | Holstege ............. 709/206 |
| 7,580,970 | B2 | * | 8/2009  | Bank et al. ............. 709/202 |
| 2003/0233305 | A1 | * | 12/2003 | Solomon ............. 705/37 |
| 2007/0088707 | A1 | * | 4/2007  | Durgin et al. ............. 707/10 |
| 2007/0100834 | A1 | * | 5/2007  | Landry et al. ............. 707/10 |

OTHER PUBLICATIONS

E. Panagos et al., "Synchronization and Recovery In Client-server Storage System", Aug. 1997, The VLDB Journal—The International Journal on Very Large Data Bases, vol. 6, Issue 3, pp. 209-223.*
Shirish Phatak et al., "Transaction-Centric Reconciliation in Disconnected Client-Server Databases", Oct. 2004, Mobile Networks and Applications, vol. 9, Issue 5, pp. 459-471.*
"Developing Multiagent Systems: The Gaia Methodology," ACM Digital Library, Zambonelli, F. et al., 2003.
"Formal Methods and the Certification of Critical Systems," ACM Digital Library, Rushby, J. et al., 1993.

* cited by examiner

*Primary Examiner*—Wei Y Zhen
*Assistant Examiner*—Chih-Ching Chow
(74) *Attorney, Agent, or Firm*—Kunzler Needham Massey & Thorpe

(57) ABSTRACT

A system and method to automatically identify resources requiring upgrade in a hierarchical database management system. The system may include an input module to receive input identifying a single resource for upgrade. A comparator module may compare an active resource library to a staging library to identify additional resources for upgrade, and an incorporation module may incorporate the single input resource and the additional resources into an upgrade list. A generation module may then automatically derive a unit of change from this list, where the unit of change includes the single input resource as well as additional resources that interact with the input resource.

4 Claims, 3 Drawing Sheets

SYSTEM AND METHOD FOR AUTOMATICALLY IDENTIFYING A UNIT OF CHANGE REQUIRING UPGRADE IN A DATABASE MANAGEMENT SYSTEM

BACKGROUND OF THE INVENTION

1. Field of the Invention

The invention relates to systems and methods for upgrading resources in a database management system. Specifically, the invention relates to systems and methods for identifying a unit of change requiring upgrade as a result of interdependencies between resources in a hierarchical database management system.

2. Description of the Related Art

Resources in a database management system require periodic upgrades to optimize system infrastructure to stay current with improving technologies and changing system requirements. Interrelationships between resources in a database management system complicate upgrades, however, as all resources that require access to a changed or upgraded resource must also be upgraded to be consistent with the changed resource.

Traditionally, implementing resource upgrades in a database management system has required a user to independently identify resource interrelationships and manually group into a unit of change those resources affected by association with a resource requiring upgrade. All resources specified in the unit of change may be upgraded substantially simultaneously to avoid conflicts otherwise resulting from incompatible resource structures.

Historically, this system for implementing resource upgrades has proven inefficient as both time and labor intensive, and often ineffective due to its inherent propensity for error. Indeed, large numbers of system resources and complex interrelationships therebetween render such a system vulnerable to misidentification and/or failed identification of affected resources required for inclusion in the unit of change. Errors in completely or accurately identifying affected resources in the unit of change may result in inconsistencies between system resources that impair the effectiveness of the upgrade, as well as mandate additional time and labor to remedy the problem.

From the foregoing discussion, it should be apparent that a need exists for a system and method to automatically identify a unit of change requiring upgrade in a database management system due to interrelationships between resources in the system. Beneficially, such a system and method would promote upgrade process efficiencies and decrease an incidence of misidentification and/or failed identification of affected resources included in a unit of change. Such a system and method are disclosed and claimed herein.

SUMMARY OF THE INVENTION

The present invention has been developed in response to the present state of the art, and in particular, in response to the problems and needs in the art that have not yet been met for identifying a unit of change requiring upgrade in a database management system. Accordingly, the present invention has been developed to provide a system and method for automatically identifying a unit of change requiring upgrade in a database management system that overcomes many or all of the above-discussed shortcomings in the art.

A system for automatically identifying a unit of change requiring upgrade in a hierarchical database management system in accordance with the present invention may include a hierarchical database management system, an active resource library, a staging library, and an upgrade module. The hierarchical database management system may manage a plurality of resources, while the active resource library may identify each of the resources and associated resources that interact with each resource. The resources may include databases and application programs that interact with the databases.

The staging library may identify one or more resources for upgrade. The upgrade module may utilize this information to automatically identify certain resources to include in a unit of change requiring upgrade.

For example, the upgrade module may include an input module, a comparator module, an incorporation module, and a generation module. The input module may require a user to input exactly one resource identified for upgrade in the staging library. The comparator module may compare the active resource library to the staging library to identify additional resources requiring upgrade, and the incorporation module may incorporate the input resource and the additional resources into an upgrade list. The generation module may then utilize the upgrade list to generate a unit of change that includes the input resource as well as additional resources that interact with the input resource.

In certain embodiments, the comparator module may identify additional resources requiring upgrade by identifying a discrepancy between a first timestamp associated with a resource in the active resource library and a second timestamp associated with the resource in the staging library. In other embodiments, the upgrade module of the present invention may further include an implementation module to implement required upgrades in those resources included in the unit of change.

A method of the present invention is also presented for automatically identifying a unit of change requiring upgrade in a hierarchical database management system. In one embodiment, the method includes providing a hierarchical database management system to manage a plurality of resources, providing an active resource library to identify each of the plurality of resources and associated resources interacting with the plurality of resources, and providing a staging library to identify for upgrade one or more of the plurality of resources. As in the system of the present invention, the plurality of resources may include databases and application programs interacting with the databases.

The method may further comprise inputting, by a user, exactly one resource identified for upgrade in the staging library. The active resource library may be compared to the staging library to identify additional resources requiring upgrade. The input resource and the additional resources may then be incorporated into an upgrade list. The method may further include automatically generating, from the upgrade list, a unit of change including the input resource as well as additional resources interacting with the input resource.

In certain embodiments, comparing the active resource library to the staging library may include identifying a discrepancy between a first timestamp associated with a resource in the active resource library and a second timestamp associated with the same resource in the staging library. In other embodiments, the method of the present invention may further include implementing required upgrades in the input resource and the additional resources included in the unit of change.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
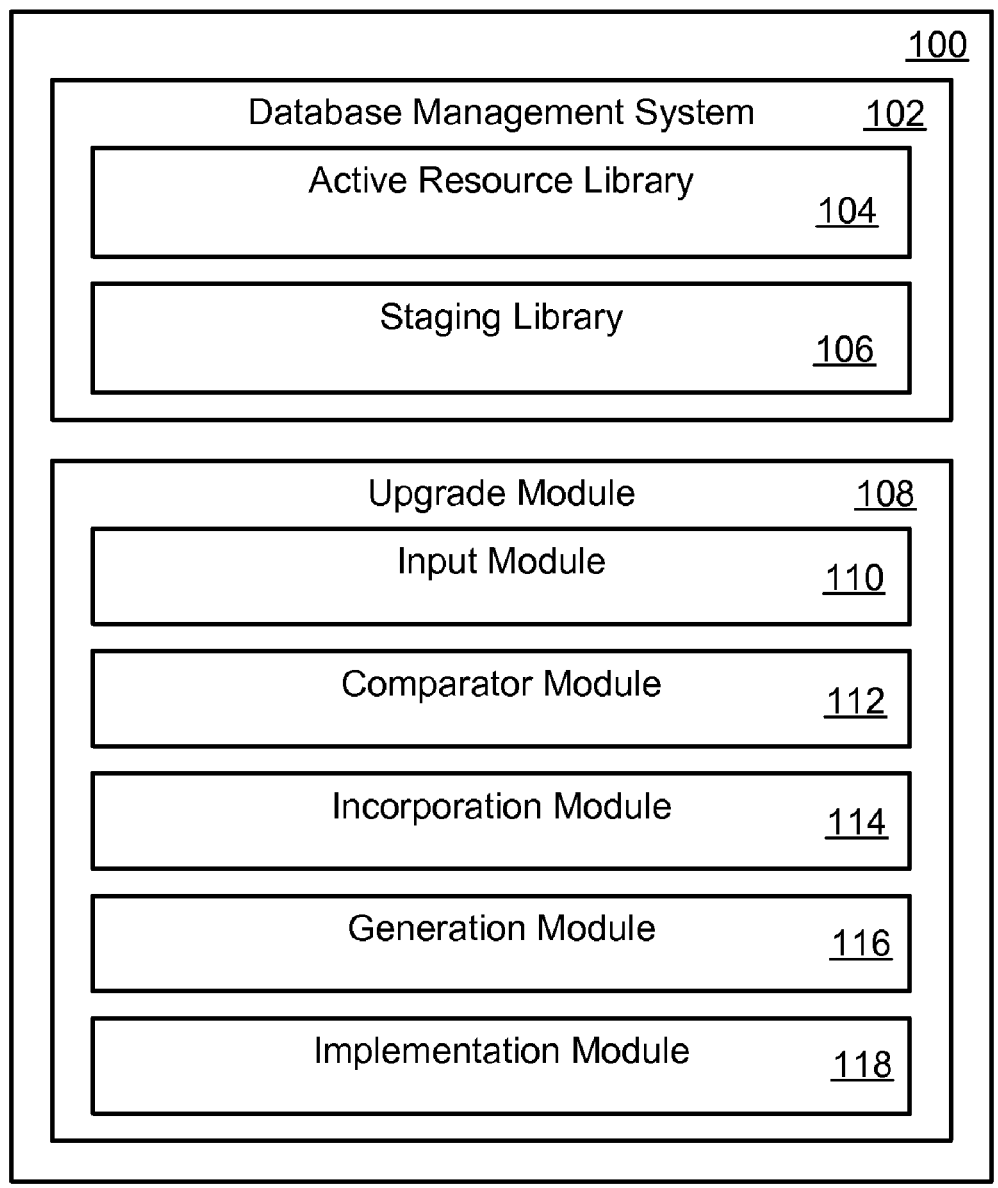
FIG. 1 is a block diagram illustrating a system for automatically identifying a unit of change requiring upgrade in accordance with the present invention.

It will be readily understood that the components of the present invention, as generally described and illustrated in the Figures herein, may be arranged and designed in a wide variety of different configurations. Thus, the following more detailed description of the embodiments of the apparatus, system, and method of the present invention, as presented in the Figures, is not intended to limit the scope of the invention, as claimed, but is merely representative of selected embodiments of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, function, or other construct. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, user interfaces, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

As used in this specification, the term "database management system" or "DBMS" refers to software used to control the organization, storage, manipulation and retrieval of data from a database. The term "upgrade" refers to a process for improving performance in a computer system, including installing a newer or more powerful version of a software package or a piece of hardware, or replacing existing software or hardware with an improved version of the same. The term "resource" refers to a database or an application program managed by a database management system.

Referring now to FIG. 1, a system 100 to automatically identify a unit of change requiring upgrade in a hierarchical database management system may include a hierarchical database management system 102, such as International Business Machine's Information Management System ("IMS®"), to manage various databases and application programs that interact with such databases. The database management system 102 may include an active resource library 104 to identify active databases and application programs, and a staging library 106 to identify one or more databases or application programs requiring new installation, removal or upgrade.

As discussed in more detail with reference to FIG. 2 below, the staging library 106 may store a copy of information stored in the active library 104. Information in the staging library 106 may be selectively modified by a user to reflect anticipated upgrades to certain databases and/or application programs listed therein. A user may run a maintenance utility, such as an Application Control Block ("ACB") maintenance utility, to create such upgrades, or may manually or otherwise indicate certain resources requiring upgrade in the staging library 106. In any case, modifications made to information in the staging library 106 may be copied to the active library 104 only after the user affirmatively authorizes and implements such changes, as discussed in more detail below.

A system 100 in accordance with the present invention may further include an upgrade module 108 to automatically identify a unit of change requiring upgrade in the database management system 102. The upgrade module 108 may include an input module 110, a comparator module 112, an incorporation module 114, a generation module 116, and, in some embodiments, an implementation module 118.

An input module 110 may require a user to input one or more resources identified for upgrade in the staging library 106. In some embodiments, the input module 110 may display a command field requiring the user to input a single resource identified for upgrade in the staging library 106. Based on this identification, the present invention may compile a complete unit of change associated with the resource, as discussed in more detail below.

The comparator module 112 may compare the active resource library 104 to the staging library 106 to identify additional resources requiring upgrade. Particularly, the comparator module 112 may determine discrepancies between corresponding information in each of the active and staging libraries 104 and 106 to identify resources requiring upgrade. In one embodiment, for example, each of the active and staging libraries 104 and 106 includes a timestamp associated with each identified resource. The timestamp in the staging library 106 may vary from a corresponding timestamp in the active library 104 to indicate an anticipated upgrade to the resource associated therewith. In other embodiments, the staging library 106 may otherwise distinguish a resource requiring upgrade by, for example, marking the resource, removing the resource, renaming the resource, or distinguishing the resource by any other means known to those in the art.

An incorporation module 114 may incorporate the resource identified by the input module 110 and the additional resources identified for upgrade by the comparator module 112 into one or more upgrade lists. Particularly, the incorporation module 114 may integrate all resources identified for upgrade by both the input module 110 and the comparator module 112 into a single upgrade list, or may maintain resources identified for upgrade in separate lists based on resource type, origin, and/or any other useful organizational scheme known to those in the art. For example, the incorporation module 114 may maintain a first upgrade list of databases identified for upgrade by the input module 110, a second upgrade list of application programs identified for upgrade by the input module 110, a third upgrade list of additional databases identified for upgrade by the comparator module 112, and a fourth upgrade list of additional application programs identified for upgrade by the comparator module 112. Alternatively, upgrade lists produced by the incorporation module 114 may be organized according to any criteria and by any means known to those in the art.

A generation module 116 may automatically generate from the one or more upgrade lists a unit of change comprising the resource identified for upgrade by the input module 110, as well as additional resources identified for upgrade by the comparator module 112, where the additional resources interact with the resource identified for upgrade by the input module 110. Accordingly, the unit of change produced by the generation module 116 may comprise a subset of those resources incorporated into the upgrade lists by the incorporation module 114. The generation module 116 may verify that the unit of change is accurate by isolating in the staging library 106 each additional resource included in the unit of change. The generation module 116 may then verify that the resource identified for upgrade by the input module 110 is identified in the staging library 106 as a resource that interacts with the additional resource.

For example, in embodiments where the input module 110 identifies exactly one resource identified for upgrade in the staging library 106, the unit of change may include only that resource and additional resources identified for upgrade by the comparator module 112 that interact with that resource. The additional resources included in the unit of change may be fewer than those included in the upgrade lists, since anticipated upgrades identified in the staging library 106 may include upgrades to resources that do not interact with the resource identified by the input module 110.

In certain embodiments, the upgrade module 108 of the present invention may further include an implementation module 118 to implement upgrades in the resources included in the unit of change. The implementation module 118 may require prior affirmative approval from a user to authorize implementation of upgrades in the resources included in the unit of change. Once approved, the implementation module 118 may implement the upgrades to resources in the database management system 102, as well as copy the implemented changes from the staging library 106 to the active resource library 104. In this manner, the active resource library 104 may continuously and accurately reflect a current status of resources in the database management system 102.

Figure 2:
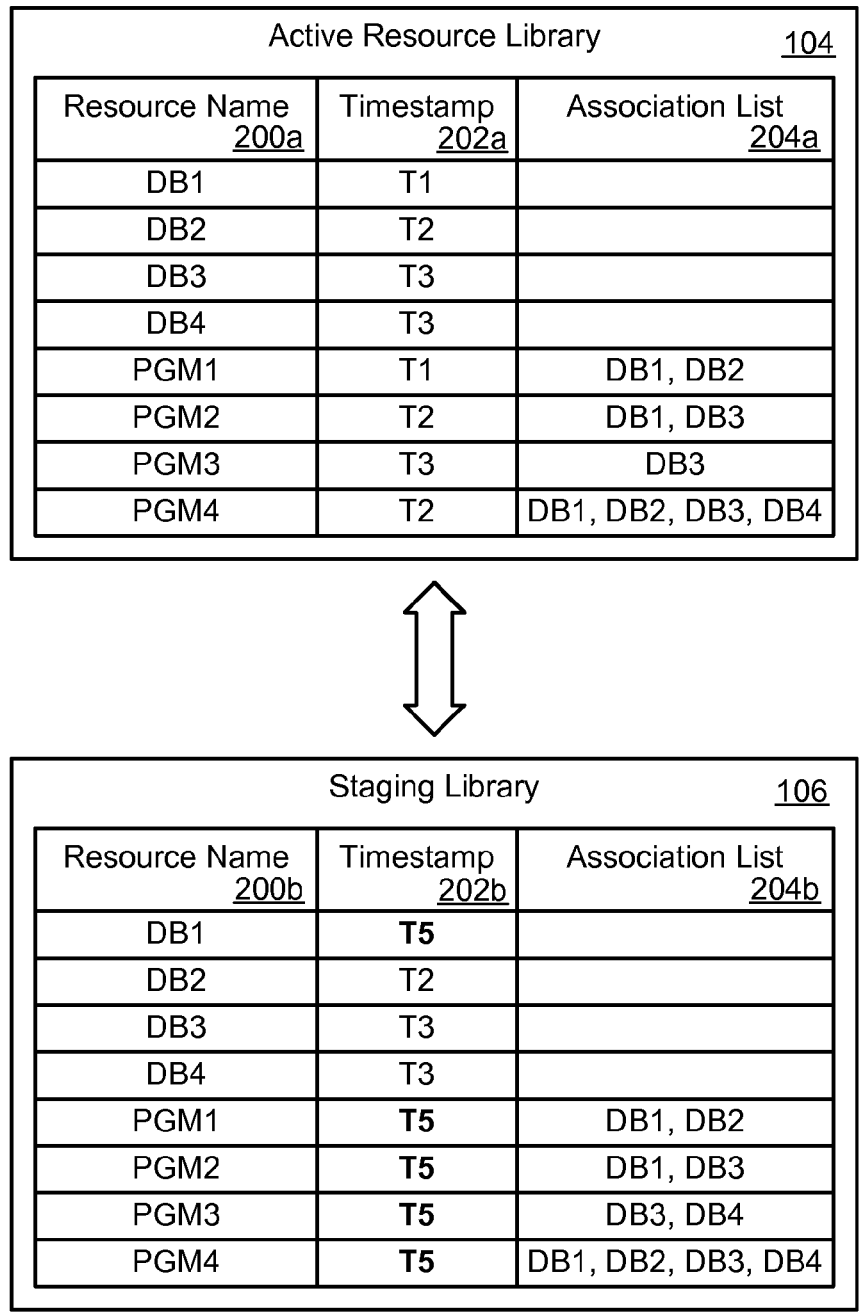
FIG. 2 is a block diagram detailing an active resource library and a staging library in accordance with embodiments of the present invention.
Figure 3:
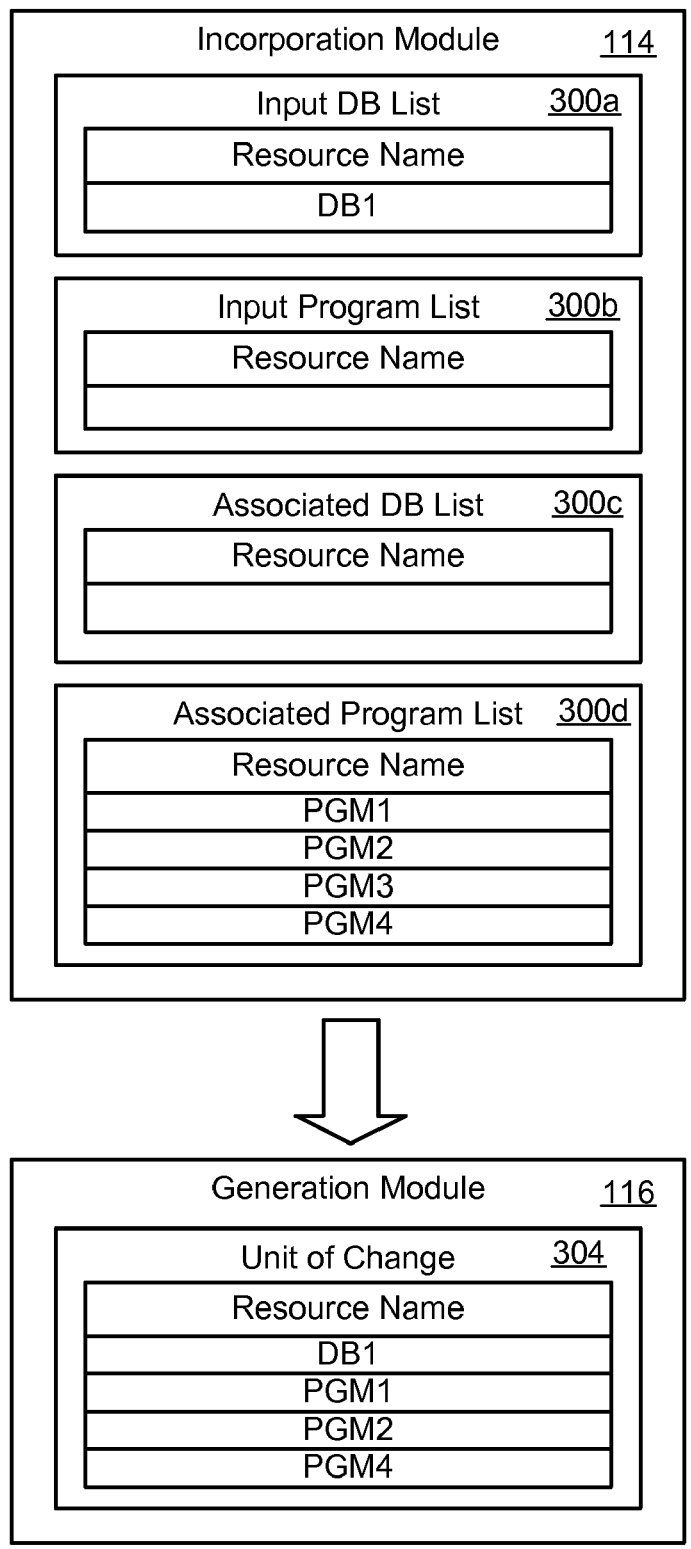
FIG. 3 is a block diagram detailing an incorporation module and a generation module in accordance with certain embodiments of the present invention.

Referring now to FIGS. 2 and 3, in one embodiment, the active resource library 104 and the staging library 106 may include tables of resources 200a, 200b, their associated timestamps 202a, 202b, and associated resources interacting with each resource 204a, 204b. The timestamps 202a, 202b may reflect a time the resource 200a, 200b was last upgraded, or a future time that the resource 200a, 200b is scheduled for upgrade. Specifically, timestamps 202a included in the active resource library 104 may reflect a time the resource 200a was last upgraded, while timestamps 202b associated with the staging library 106 may reflect either a time the resource was last upgraded, or a future time that the resource 200b is scheduled for upgrade. A resource 200b in the staging library 106 may include a future timestamp 202b to distinguish the resource 200b from its counterpart 200a in the active resource library 104 and thereby identify the resource 200b as requiring upgrade, as discussed with reference to FIG. 1 above.

In one embodiment, for example, a user identifies in the staging library 106 upgrades to DB1 and to all resources that interact with DB1. The user also adds DB4 to interact with PGM3, although DB4 itself is not changed or upgraded. To initiate upgrades as outlined in the staging library 106 and as depicted by FIG. 2, the user may specify DB1 as a resource requiring upgrade in response to a command from the input module 110. The comparator module 112 may then compare the active resource library 104 to the staging library 106 to derive additional resources marked for upgrade. In this example, the additional resources include PGM1, PGM2, PGM3 and PGM4. The incorporation module 114 may then incorporate each of DB1 and the additional resources (PGM1, PGM2, PGM3 and PGM4) into an upgrade list 300, as shown in FIG. 3. In this example, the upgrade list 300 comprises four disparate lists, each identified according to resource type and origin. Specifically, DB1 is added to an Input Database List 300a, while PGM1, PGM2, PGM3 and PGM are added to an Associated Program List 300d. An Input Program List 300b and an Associated Database List 300c remain vacant.

Continuing the previous example, the generation module 116 may generate a unit of change 304 derived from the upgrade lists 300a-d. Each resource included in the unit of change 304, however, must be associated with the resource received by the input module 110. As previously discussed, these associated resources comprise the resource input by the user in response to a command by the input module 110, as well as resources that interact with the input resource. Thus, the unit of change 304 generated in the present example includes DB1, PGM1, PGM2 and PGM4. PGM3 is not included in the unit of change 304 because, although it has been marked for upgrade in the staging library 106, it does not interact with the user-specified resource, DB1. The generation module 116 may isolate DB1, PGM1, PGM2 and PGM 4 in the staging library 106 to verify that each interacts with DB1 as required.

In some embodiments, an implementation module 118 may implement upgrades to each resource included in the unit of change 304 upon receiving user authorization. The active resource library 104 may then be updated to reflect the implemented upgrades.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system to automatically identify a unit of change requiring upgrade in a hierarchical database management system, comprising:
   a storage device storing executable code;
   a processor executing the executable code, the executable code comprising:
      a hierarchical database management system to manage a plurality of resources, the resources comprising databases and application programs interacting with the databases;
      an active resource library storing resource information identifying each of the plurality of resources and associated resources interacting with the plurality of resources;
      a staging library storing a copy of the resource information, the resource information of the copy modified to identify for upgrade at least one of the plurality of resources; and
      an upgrade module for automatically identifying a unit of change requiring upgrade in the database management system, the upgrade module comprising:
         an input module to input, by a user, exactly one resource identified for upgrade in the staging library;
         a comparator module to compare the active resource library to the staging library to identify additional resources requiring upgrade, the additional resources having an association with the exactly one resource identified for upgrade, the association comprising an inter-relationship between databases and application programs interacting with the databases, the comparator module further identifying a first resource as an additional resource requiring upgrade by detecting a discrepancy between a first timestamp associated with the first resource in the active resource library and a second timestamp associated with the first resource in the staging library;
         an incorporation module to incorporate the exactly one resource identified for upgrade and the additional resources into an upgrade list; and
         a generation module to automatically generate from the upgrade list a unit of change comprising the exactly one resource identified for upgrade and additional resources interacting with the exactly one resource.

2. The system of claim 1, wherein the upgrade module further comprises an implementation module to implement required upgrades in the exactly one resource identified for upgrade and the additional resources interacting with the exactly one resource that comprise the unit of change.

3. A computer program product comprising a non-transitory computer readable medium having computer usable program code programmed for automatically identify a unit of change requiring upgrade in a hierarchical database management system, the operations of the computer program product comprising:
   providing a hierarchical database management system to manage a plurality of resources, the resources comprising databases and application programs interacting with the databases;
   providing an active resource library storing resource information identifying each of the plurality of resources and associated resources interacting with the plurality of resources;
   providing a staging library storing a copy of the resource information, the resource information of the copy modified to identify for upgrade at least one of the plurality of resources;
   inputting, by a user, exactly one resource identified for upgrade in the staging library;
   comparing the active resource library to the staging library to identify additional resources requiring upgrade, the additional resources having an association with the exactly one resource identified for upgrade, the association comprising an inter-relationship between databases and application programs interacting with the databases;
   identifying a first resource as an additional resource requiring upgrade by detecting a discrepancy between a first timestamp associated with the first resource in the active resource library and a second timestamp associated with the first resource in the staging library;
   incorporating the exactly one resource identified for upgrade and the additional resources into an upgrade list; and
   automatically generating, from the upgrade list, a unit of change comprising the exactly one resource identified for upgrade and additional resources interacting with the exactly one resource.

4. A computer program product of claim 3, further comprising implementing required upgrades in the exactly one resource identified for upgrade and additional resources interacting with the exactly one resource that comprise the unit of change.

* * * * *